United States Patent
Iverson et al.

(10) Patent No.: US 8,887,806 B2
(45) Date of Patent: Nov. 18, 2014

(54) METHOD FOR QUANTIFYING CEMENT BLEND COMPONENTS

(75) Inventors: Benjamin John Iverson, Duncan, OK (US); Ray Loghry, Duncan, OK (US); Christopher Lane Edwards, Pampa, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 329 days.

(21) Appl. No.: 13/116,739

(22) Filed: May 26, 2011

(65) Prior Publication Data

US 2012/0298358 A1 Nov. 29, 2012

(51) Int. Cl.

| | | |
|---|---|---|
| E21B 33/138 | (2006.01) | |
| E21B 49/08 | (2006.01) | |
| G06G 99/00 | (2009.01) | |
| G01N 23/20 | (2006.01) | |
| C04B 28/04 | (2006.01) | |
| C04B 28/02 | (2006.01) | |
| C09K 8/46 | (2006.01) | |
| C09K 8/473 | (2006.01) | |
| C09K 8/48 | (2006.01) | |
| E21B 33/13 | (2006.01) | |
| C04B 111/00 | (2006.01) | |

(52) U.S. Cl.
CPC ............... *C04B 28/04* (2013.01); *C04B 28/02* (2013.01); *C09K 8/46* (2013.01); *C09K 8/473* (2013.01); *C09K 8/48* (2013.01); *E21B 33/13* (2013.01); *C04B 2111/00189* (2013.01)
USPC ............. 166/285; 166/253.1; 703/10; 378/73

(58) Field of Classification Search
None
See application file for complete search history.

(56) References Cited

U.S. PATENT DOCUMENTS

| | | | |
|---|---|---|---|
| 2,805,719 A | 9/1957 | Anderson | |
| 4,565,578 A | 1/1986 | Sutton et al. | |
| 4,935,060 A | 6/1990 | Dingsoyr | |
| 5,123,487 A * | 6/1992 | Harris et al. | 166/277 |

(Continued)

FOREIGN PATENT DOCUMENTS

| | | |
|---|---|---|
| EP | 1260812 A1 | 11/2002 |
| EP | 1522847 A1 | 4/2005 |

(Continued)

OTHER PUBLICATIONS

Hong et al.; Quantitative XRD Analysis of Cement Clinker by the Multiphase Rietveld Method; Sep. 2003; Wuhan University of Technology; vol. 18, No. 3; pp. 56-59.*

(Continued)

*Primary Examiner* — Doug Hutton, Jr.
*Assistant Examiner* — Anuradha Ahuja
(74) *Attorney, Agent, or Firm* — Craig Roddy; Conley Rose, P.C.

(57) ABSTRACT

Disclosed herein is a method of servicing a wellbore comprising the steps of preparing a dry cement blend comprising a base cement and a crystalline component wherein the dry cement blend is based on an initial dry cement blend formulation, obtaining a diffraction pattern of a sample of the dry cement blend, generating a model diffraction pattern, refining the model diffraction pattern using a structural refinement method, determining the type and amount crystalline components present in the dry cement blend, generating a final dry cement blend formulation, and comparing the initial dry cement blend formulation to the final dry cement blend formulation.

20 Claims, 1 Drawing Sheet

(56) References Cited

U.S. PATENT DOCUMENTS

| | | | |
|---|---|---|---|
| 5,125,455 A * | 6/1992 | Harris et al. | 166/292 |
| 5,159,980 A | 11/1992 | Onan et al. | |
| 5,293,938 A | 3/1994 | Onan et al. | |
| 5,346,012 A | 9/1994 | Heathman et al. | |
| 5,418,829 A | 5/1995 | Nagano | |
| 5,475,220 A * | 12/1995 | Hughes et al. | 250/339.09 |
| 5,588,488 A | 12/1996 | Vijn et al. | |
| 5,688,844 A | 11/1997 | Chatterji et al. | |
| 5,826,669 A | 10/1998 | Zaleski et al. | |
| 5,913,364 A | 6/1999 | Sweatman | |
| 6,167,967 B1 | 1/2001 | Sweatman | |
| 6,234,251 B1 | 5/2001 | Chatterji et al. | |
| 6,258,757 B1 | 7/2001 | Sweatman et al. | |
| 6,330,917 B2 | 12/2001 | Chatterji et al. | |
| 6,593,402 B2 | 7/2003 | Chatterji et al. | |
| 6,715,553 B2 | 4/2004 | Reddy et al. | |
| 6,722,434 B2 | 4/2004 | Reddy et al. | |
| 6,821,361 B2 | 11/2004 | Fujimura et al. | |
| 6,858,566 B1 | 2/2005 | Reddy et al. | |
| 6,892,814 B2 | 5/2005 | Heathman et al. | |
| 6,911,078 B2 | 6/2005 | Barlet-Gouedard et al. | |
| 7,048,054 B2 | 5/2006 | Heathman et al. | |
| 7,184,517 B2 | 2/2007 | Kern | |
| 7,213,646 B2 | 5/2007 | Roddy et al. | |
| 7,264,053 B2 | 9/2007 | Vargo, Jr. et al. | |
| 7,488,705 B2 | 2/2009 | Reddy et al. | |
| 7,530,396 B1 | 5/2009 | Reddy et al. | |
| 7,537,653 B2 | 5/2009 | Garcia Luna et al. | |
| 7,559,369 B2 | 7/2009 | Roddy et al. | |
| 7,631,692 B2 | 12/2009 | Roddy et al. | |
| 7,792,250 B1 * | 9/2010 | Iverson et al. | 378/73 |
| 7,806,183 B2 | 10/2010 | Roddy et al. | |
| 7,892,352 B2 | 2/2011 | Roddy et al. | |
| 7,913,757 B2 | 3/2011 | Reddy et al. | |
| 2006/0217270 A1 | 9/2006 | Vargo, Jr. et al. | |
| 2006/0272819 A1 | 12/2006 | Santra et al. | |
| 2007/0062691 A1 * | 3/2007 | Reddy et al. | 166/250.01 |
| 2009/0105099 A1 * | 4/2009 | Warrender et al. | 507/269 |
| 2009/0120640 A1 | 5/2009 | Kulakofsky et al. | |
| 2009/0137431 A1 | 5/2009 | Reddy et al. | |
| 2009/0308611 A1 * | 12/2009 | Santra et al. | 166/293 |
| 2010/0108310 A1 | 5/2010 | Fowler et al. | |
| 2011/0100626 A1 | 5/2011 | Brenneis et al. | |

FOREIGN PATENT DOCUMENTS

| | | |
|---|---|---|
| EP | 1260812 B1 | 11/2006 |
| WO | 2010125327 A1 | 11/2010 |
| WO | 2011042705 A1 | 4/2011 |
| WO | 2012160340 A1 | 11/2012 |

OTHER PUBLICATIONS

Scrivener et al.; Quantitative Study of Portland Cement Hydration by X-Ray diffraction/Rietveld Analysis and Independent Methods; 2004; Cement and Concrete Research 34; pp. 1541-1547.*

Stutzman; Guide for X-Ray Powder Diffraction Analysis of Portland Cement and Clinker; Mar. 1996; U.S. Department of Commerce; pp. 1-38.*

Colston, Sally L., et al., "An in situ synchrotron energy-dispersive diffraction study of the hydration of oilwell cement systems under high temperature/autoclave conditions up to 130° C.," Cement and Concrete Research, 2005, pp. 2223-2232, vol. 35, Elsevier Ltd.

Foreign communication from a related counterpart application—International Search Report and Written Opinion, PCT/GB2012/000474, Oct. 19, 2012, 10 pages.

Mueller, Dan, "An evaluation of well cements for use in high stress environments," XP-000793073, Apr. 1998, pp. 91-93, Hart's Petroleum Engineer International.

Scrivener, K. L., et al., Quantitative study of Portland cement hydration by X-ray diffraction/Rietveld analysis and independent methods, Cement and Concrete Research, 2004, pp. 1541-1547, vol. 34, Elsevier Ltd.

Anthony, John W., et al., "Handbook of mineralogy," 2010, 1 page, Mineralogical Society of America.

Baroid brochure entitled "STEELSEAL® lost circulation materials," Apr. 2008, 2 pages, Halliburton.

Baroid brochure entitled "STEELSEAL FINE™ lost circulation material," 2002, 1 page, Halliburton.

Bish, D. L., et al., "Modern powder diffraction," 1989, 1 page, Mineralogical Association of America, Washington.

Bruker AXS product information sheet, "DIFFRACplus TOPAS," http://www.bruker-axs.de/topas.html, Jun. 10, 2010, 2 pages, © 2010, Bruker AXS.

Chapuis, Gervais, "The Rietveld method: introduction to crystal structure refinement based on powder diffraction measurement," Nov. 15, 2006, 9 pages, Lausanne.

Collaborative computational project No. 14 (CCP14) available downloads, http://www.ccp14.ac.uk/tutorial/tutorial.htm, Jun. 10, 2010, 3 pages.

Cullity, B. D., et al., "Elements of x-ray diffraction," Third Edition, 2001, 3 pages, Prentice Hall.

FullProf Suite product information sheet, "FP_Studio," http://www.ill.eu/sites/fullprof/php/programs71b4.html?pagina=FP_Studio, Jun. 10, 2010, 1 page, © 2006, The FullProf Team.

GSAS homepage on CCP14, http://www.ccp14.ac.uk/solution/gsas/, Jun. 10, 2010, 2 pages.

Halliburton brochure entitled "Super CBL™ additive," Aug. 2007, 2 pages, Halliburton.

Materials analysis using diffraction (Maud) download information, http://www.ing.unitn.it/~maud/download.html, Jun. 6, 2010, 3 pages, © 1977-2010, Luca Lutterotti.

McCusker, L. B., et al., "Rietveld refinement guidelines," Journal of Applied Crystallography, 1999, pp. 36-50, vol. 32, International Union of Crystallography.

MDI products information sheet, http://www.materialsdata.com/products.htm, Jun. 10, 2010, 2 pages, © 2009, Materials Data Incorporated.

PANalytical product information sheet, "HighScore Plus," http://www.panalytical.com/index.cfm?pid=547, Jun. 10, 2010, 2 pages, © 2010, PANalytical B.V.

Pecharsky, Vitalij K., et al., "Fundamentals of powder diffraction and structural characterization of materials," 2003, 2 pages, Kluwer Academic Publishers, Boston.

Plank, J., et al., "Comparative study of the working mechanisms of chemically different cement fluid loss polymers," SPE 121542, 2009, pp. 1-26, Society of Petroleum Engineers.

Pöllmann, H., "TV-II: well integrity; P-2: well stability, cement corrosion," Mar. 2008, 1 page.

Rietica information sheet, http://www.rietica.org/, Jun. 10, 2010, 1 page.

Rietveld, H. M., "A profile refinement method for nuclear and magnetic structures," http://www.ccp14.ac.uk/ccp/web-mirrors/hugorietveld/xtal/paper2/paper2.html, 1969, 13 pages, J. Appl. Cryst.

Rietveld, H. M., "Line profiles of neutron powder-diffraction peaks for structure refinement.," http://www.ccp14.ac.uk/ccp/web-mirrors/hugorietveld/xtal/paper1/paper1.html, 1967, 3 pages, Acta Cryst.

Rietveld, Hugo M., "The Rietveld method—the early days: a retrospective view," http://www.ccp14.ac.uk/ccp/web-mirrors/hugorietveld/xtal/paper3/paper3.html, Dec. 8, 2008, 4 pages.

Rietveld, Hugo, "The Rietveld method," http://home.planet.nl/~rietv025/, Dec. 8, 2008, 6 pages.

Scrivener, K. L., et al., "Quantitative study of Portland cement hydration by X-ray diffraction/Rietveld analysis and independent methods," Cement and Concrete Research, 2004, pp. 1541-1547, vol. 34, Elsevier Ltd.

Speakman, Scott A., "Basics of Rietveld refinement," 2007, pp. 1-25, Massachusetts Institute of Technology.

Total brochure entitled "Total Finaprene® 401 styrene-butadiene TPE copolymer," Jun. 4, 2009, 1 page, Total Petrochemicals.

Total brochure entitled "Total Finaprene® 401 thermoplastic elastomer," Jun. 4, 2009, 1 page, Total Petrochemicals.

Total brochure entitled "Total Finaprene® 411 styrene-butadiene TPE copolymer," Jun. 4, 2009, 1 page, Total Petrochemicals.

(56) References Cited

OTHER PUBLICATIONS

Total brochure entitled "Total Finaprene® 411 thermoplastic elastomer," Jun. 4, 2009, 1 page, Total Petrochemicals.
Total brochure entitled "Total Finaprene® 435 styrene-butadiene TPE copolymer," Jun. 4, 2009, 1 page, Total Petrochemicals.
Total brochure entitled "Total Finaclear® 520 clear impact polystyrene," Jun. 4, 2009, 1 page, Total Petrochemicals.
Total brochure entitled "Total Finaclear® 521 clear impact polystyrene," Jun. 4, 2009, 1 page, Total Petrochemicals.
Total brochure entitled "Total Finaclear® 530 clear impact polystyrene," Jun. 4, 2009, 1 page, Total Petrochemicals.
Total brochure entitled "Total Finaclear® MBF clear impact polystyrene," Jun. 4, 2009, 1 page, Total Petrochemicals.
Understanding Cement website, "Cement hydration," http://www.understanding-cement.com/hydration.html, Dec. 10, 2008, 4 pages, WHD Microanalysis Consultants Ltd.
Understanding Cement website, "Concrete strength," http://www.understanding-cement.com/strength.html, Dec. 10, 2008, 3 pages, WHD Microanalysis Consultants Ltd.
Young, R. A., "The Rietveld method," 1993, pp. 1-4, 12-38, 43-54 plus 1 cover page and 1 publishing page, Oxford University Press Inc., New York.
Baroid brochure entitled "BAROID® 41," Mar. 25, 2010, 1 page, Halliburton.
Baroid brochure entitled "SWEEP-WATE®," May 13, 2010, 1 page, Halliburton.
Halliburton brochure entitled "Barite heavyweight additive," Aug. 2007, 2 pages, Halliburton.
Halliburton brochure entitled "Hi-Dense® weight additives," Aug. 2007, 2 pages, Halliburton.
Halliburton brochure entitled "MICROMAX™ weight additive," Aug. 2007, 2 pages, Halliburton.

* cited by examiner

METHOD FOR QUANTIFYING CEMENT BLEND COMPONENTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Zonal isolation refers to the isolation of a subterranean formation or zone from other subterranean formations. The subterranean formation or zone may serve as a source of a natural resource such as oil, or water. To achieve isolation of a subterranean formation, a wellbore is typically drilled down to the subterranean formation while circulating a drilling fluid through the wellbore. After the drilling is terminated, a string of pipe (e.g., casing) is run in the wellbore. Next, primary cementing is typically performed whereby a cement slurry is placed in the annulus and permitted to set into a hard mass, thereby attaching the string of pipe to the walls of the wellbore and sealing the annulus. Subsequent secondary cementing operations such as squeeze cementing may also be performed.

The physical characteristics of a cement are generally due to the nature of the cementious materials formed as a result of the reaction of cement with water, that is, the hydration of the cement. As hydration occurs, the cement develops various phases which impart physical characteristics (e.g., strength) to the cement. Once the cement is mixed with water, the hydration process begins and continues for so long as cementitious material and water are present in reactive forms and quantities.

Thus an ongoing need exists for improved cement compositions and methods of using same.

SUMMARY

Disclosed herein is a method of servicing a wellbore comprising the steps of preparing a dry cement blend comprising a base cement and a crystalline component wherein the dry cement blend is based on an initial dry cement blend formulation, obtaining a diffraction pattern of a sample of the dry cement blend, generating a model diffraction pattern, refining the model diffraction pattern using a structural refinement method, determining the type and amount crystalline components present in the dry cement blend, generating a final dry cement blend formulation, and comparing the initial dry cement blend formulation to the final dry cement blend formulation.

DETAILED DESCRIPTION

Figure 1A:
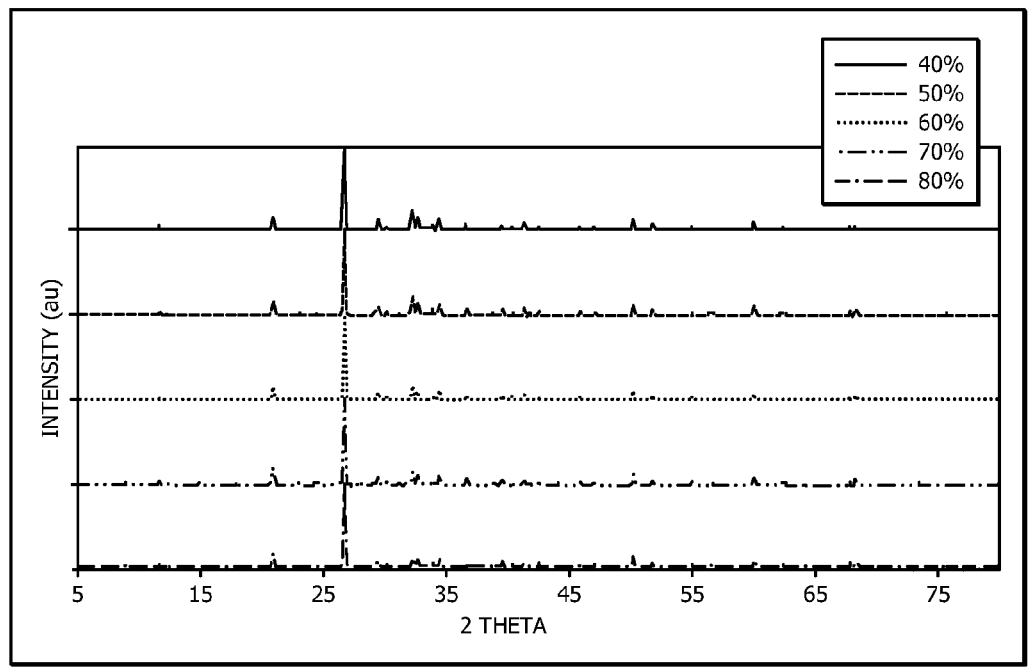
FIG. 1A is an overlay of XRD spectra for the samples from Example 2.

It should be understood at the outset that although an illustrative implementation of one or more embodiments may be provided herein, the disclosed methods may be implemented using any number of techniques. This disclosure should in no way be limited to the illustrative implementations, drawings, and techniques illustrated herein, including the exemplary designs and implementations illustrated and described herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ." Reference to up or down will be made for purposes of description with "up," "upper," "upward," or "upstream" meaning toward the surface of wellbore and with "down," "lower," "downward," "downhole," or "downstream" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

Cements are often a mixture of one or more types of cementitious materials. For example, a base cement may be a mixture of clinker, gypsum, and blast furnace slag. The base cement is often modified through the addition of one or more other cementitious materials to form a cement blend that functions to meet some user and/or process goal. In some instances, the base cement is formed into a cement blend by the addition of one or more types of crystalline materials that are a factor in determining the type and extent of crystalline phases formed in the hydrated and set cement. It is the type and extent of crystalline phases formed that determine the suitability of a cement composition for a particular application. In order to maximize the likelihood that a cement blend is suitable for use in a particular application, a methodology for identifying and quantifying the crystalline components of a cement blend would be desirable.

Disclosed herein are methodologies for the identification and quantification of the crystalline components of a cement blend. In an embodiment, the methodology disclosed herein comprises formulating and preparing a dry cement blend (DCB), conducting a crystallographic analysis of a sample of the DCB and identifying and quantifying the crystalline components of the sample using a refinement method. In an embodiment, the method further comprises hydrating the DCB to form a slurry and placing the slurry in a wellbore.

Herein references to a "base cement" are meant to refer to a cementitious material as received from a commercially available source or as prepared using conventional techniques. The "base cement" as referred to herein has not been altered or adjusted to meet the needs of a particular user, process and/or wellbore servicing operation. The "dry cement blend" will have been formulated to meet one or more needs of a particular user, process and/or wellbore servicing operation. Hereinafter references to "dry cement blend" are meant to refer to the admixture of dry cementious and crystalline components which have not yet been mixed with a liquid;

references to a "cement slurry" are meant to refer to a mixture of cementitious material (e.g., dry cement blend) and a liquid (e.g., water) prior to setting or curing; and references to a "cured cement" refer to a cement slurry which has been allowed to set, harden, or otherwise cure. References made to "cement" and "cement composition" are meant to refer generally to a dry cement, the cement slurry formed from a dry cement, or the cured cement formed by the curing of a cement slurry, but in no particular state. It is to be understood that although the DCB has not been contacted with a liquid in order to form a cement slurry, the term "dry" is not meant to denote a material devoid of water or anhydrous. The DCB may have water adventitiously associated with the components of the DCB as would the result of conventional manufacturing and/or handling procedures.

In an embodiment, the methodology comprises formulating a DCB. The DCB may be formulated to meet some baseline set of physical property expectations which were developed by an evaluation of a subterranean formation to which the cement composition is to be introduced. Such evaluations may be carried using any suitable methodology. For example, the evaluation may begin with retrieval of samples of the formation and reservoir for laboratory analysis. In particular, for a wellbore, the method may initiate with the gathering of information to produce a well log. Such information typically includes the characteristics of the earth formations traversed by the wellbore, and the location of subsurface reservoirs of the natural resource. Well logging is a technique for providing information to a formation evaluation professional, operator or driller regarding the particular earth formation being drilled. The collection of information relating to conditions downhole, which commonly is referred to as "logging," can be performed by several methods. In situ measurements of many formation properties via wellbore logging tools, such as logging-while-drilling (LWD) and wireline tools may be obtained by electromagnetic, acoustic, nuclear, or electromechanical means, for example. These logging tools enable in situ determinations of properties such as the porosity, permeability, and lithology of the rock formations; reservoir pressure and temperature in the zones of interest; identification of the fluids present; and many other parameters. Methods of evaluating a subterranean formation and acquiring the information necessary to formulate a cement blend may be selected by one of ordinary skill in the art with the benefits of this disclosure. In an embodiment, based on the evaluation of the subterranean formation an initial dry cement blend formulation is generated that is used to prepare the DCB. Herein the initial dry cement blend formulation refers to a description of each component and the amount of said component to be included in the DCB.

In an embodiment, the methodology further comprises preparing the DCB in accordance with the initial dry cement blend formation in order to achieve the baseline set of physical properties desired for the particular wellbore servicing operation. In an embodiment, the DCB comprises a base cement and one or more crystalline components.

In an embodiment, the base cement comprises a cementitious material, alternatively a hydraulic cement. Herein a hydraulic cement refers to a cement that includes calcium, aluminum, silicon, oxygen, and/or sulfur and which sets and hardens by reaction with the water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof. In an embodiment, the base cement comprises a Portland cement.

In an embodiment, the base cement is present in the DCB in an amount of from about 1 wt. % to about 99 wt. %; alternatively from about 20 wt. % to about 80 wt. %; or alternatively from about 35 wt. % to about 65 wt. % based on percentage of total volume of solids in the cement blend.

In an embodiment, the DCB comprises one or more crystalline components. In an embodiment, the crystalline component may be any crystalline material compatible with the other components of the cement blend and able to meet some user and/or process goal. For example, the crystalline component may function to inhibit strength retrogression of the cured cement at the elevated temperatures often encountered in wellbore servicing operations (e.g., greater than about 110° C.). Alternatively, the crystalline component may be a high-density additive that is included in the DCB to increase the density of the slurry formed when the DCB is contacted with a liquid, control high formation pressure, improve displacement of other wellbore servicing fluids, and the like. In an embodiment, the crystalline component comprises silica; crystalline high-density additives such as hematite, or hausmannite; salts such as calcium chloride, sodium chloride or potassium chloride; perlite; zeolites; micas; alumina; aluminum hemihydrate; organic acids such as tartaric acid; sodium pentaborate or combinations thereof. Alternatively, the crystalline component comprises silica; crystalline high-density additives such as hematite, or hausmannite; or combinations thereof.

In an embodiment, the crystalline component comprises a crystalline silica such as fine silica flour, silica flour, sand, or mixtures thereof. Fine silica flour is crystalline silica and has a particle size smaller than 20 microns. Silica flour is crystalline silica which is produced by grinding sand. The particle size of silica flour is generally in the range of from about 20 to about 40 microns. Sand is also crystalline silica and the sand can have a particle size in the range of from about 80 to about 500 microns.

In an embodiment, silica is present in the DCB in an amount of from about 0 weight percent (wt. %) to less than about 100 wt. %; alternatively from about 20 wt. % to greater than about 80 wt. %; or alternatively from about 35 wt. % to about 65 wt. % based on weight of cement in the blend.

In an embodiment, the crystalline component comprises a high-density additive (HDA). For example, the HDA may comprise barite, hematite, hausmannite, siderite, ilmenite, or combinations thereof. Barite is a nonmetallic mineral of barium sulfate ($BaSO_4$) with a specific gravity range of from about 4.3 to about 5. Examples of barites suitable for use in this disclosure include without limitation BAROID 41 and SWEEP-WATE, which are commercially available from Halliburton Energy Services, Inc. In another embodiment, the HDA comprises hematite. Hematite is a mineral form of iron (III) oxide ($Fe_2O_3$) with a specific gravity range of from about 4.9 to about 5.3. Examples of hematites suitable for use in this disclosure include without limitation HI DENSE #3 weighting agent and HI DENSE #4 weighting agent, which are commercially available from Halliburton Energy Services, Inc. In yet another embodiment, the HDA comprises hausmannite Hausmannite is a complex oxide of manganese containing both di- and and tri-valent manganese ($Mn^{2+}Mn^{3+}_2O_4$) with a specific gravity of about 4.8. An example of hausmannites suitable for use in this disclosure includes without limitation MICROMAX weighting agent which is commercially available from Elkem.

In an embodiment, the crystalline component is present in the DCB in an amount of from about 0.1 wt. % to about 200 wt. %; alternatively from about 25 wt. % to about 175 wt. %; or alternatively from about 50 wt. % to about 150 wt. % based on weight of cement.

In an embodiment, the DCB is prepared by contacting a base cement with a crystalline component, both of the type disclosed herein, to form a mixture and agitating the mixture to homogenity using any suitable technology. The amount of base cement and crystalline component may be the amounts presented in the initial dry cement blend formulation. In an embodiment, the DCB is prepared at a first site by a first operator and then provided to a second site and/or second operator. In some embodiments, the DCB is prepared at a first site by a first operator and then transported to a second site and provided to a second operator. The method may further comprise subjecting samples of the DCB to crystallographic analysis.

In an embodiment, the method further comprises obtaining a diffraction pattern of a DCB sample upon exposure to an energy source. The diffraction pattern may comprise an electron diffraction pattern, a neutron diffraction pattern, an X-Ray diffraction pattern, an electromagnetic radiation diffraction pattern, or combinations thereof. In an embodiment, the diffraction pattern comprises an X-ray diffraction (XRD) pattern. Methods of obtaining a diffraction pattern to provide crystallographic structural information are known to one of ordinary skill in the art with the aid and benefit of the present disclosure. Examples of such methods are discussed in B. D. Cullity & S. R. Stock, Elements of X-Ray Diffraction (3rd ed., Prentice Hall 2001) (1959), which is incorporated by reference herein in its entirety. The diffraction of pattern of a sample of the DCB is hereinafter denoted the "experimental diffraction pattern."

The experimental diffraction pattern may be subjected to qualitative crystallographic analysis in order to determine the presence or absence of one or more crystalline components in the DCB such as quartz. Hereinafter, the disclosure will focus on qualitative crystallographic analysis of the DCB sample in order to determine the presence or absence of a quartz crystalline phase. However, the present disclosure's description of the determination of the presence or absence of quartz crystalline phases in the DCB is intended only as an exemplary embodiment. It is contemplated that the presence or absence of any crystalline component (e.g., hematite) may be determined.

In an embodiment, the presence or absence of quartz in the DCB as indicated by a qualitative crystallographic analytical technique is evaluated. For example, the experimental diffraction pattern may be subjected to a peak pattern match (PPM) analysis wherein the experimental diffraction pattern is reviewed to determine the presence or absence of peaks that correspond to the quartz crystalline phase. Such a review may be manual or may be automated. In an embodiment, the experimental diffraction pattern serves as an input to a software program implemented on a computer of the type described herein. In such an embodiment, peaks in the experimental diffraction pattern may be compared to peaks in the diffraction pattern of samples of crystalline phase quartz (e.g., reference samples) to ascertain whether the patterns share commonality among the peaks sufficient to indicate the presence of a quartz crystalline phase. Other techniques for qualitative crystallographic analysis of the experimental diffraction pattern would be known to one of ordinary skill in the art with the aid of this disclosure and may be employed to determine the presence or absence of a quartz crystalline phase in the DCB sample. As will be understood by one of ordinary skill in the art, qualitative crystallographic analytical techniques of the type described herein can only provide an indication as to the presence or absence of the materials that comprise a crystalline phase (e.g., quartz crystalline phase) and further evaluation of the DCB, as will be described later herein, is required to conclusively establish the presence of a particular crystalline phase.

Once the qualitative crystallographic analysis has been performed; i.e., experimental diffraction pattern obtained and nature of crystalline components present established; the experimental diffraction pattern of the DCB may be further evaluated to derive quantitative crystallographic structural information. Quantitative crystallographic structural information that may be obtained from the experimental diffraction pattern includes without limitation lattice parameters, atomic positions, fractional occupancies, thermal parameters, relative phrase fractions, grain size, texture, and combinations thereof. For example, the experimental diffraction pattern may be analyzed by one or more programs that provide as an output quantitative crystallographic structural information of the type described herein. Methodologies for the determination of quantitative crystallographic structural information from an experimental diffraction pattern are known to one of ordinary skill in the art with the aid and benefit of the present disclosure. In an embodiment, the experimental diffraction pattern of the DCB sample is further subjected to quantitative crystallographic analysis so as to quantify the phase fraction of one or more crystalline phases present in the DCB as will be described in more detail later herein.

In an embodiment, it may be difficult or even impossible to directly determine the phase fraction for each phase present within a DCB sample. This may be due to the multiplicity of phases present within the DCB sample. In such an embodiment, the phase fraction may be inferred from a model or theoretical representation of the diffraction pattern of the DCB.

In an embodiment, the methodology disclosed herein further comprises developing a theoretical diffraction pattern of the DCB sample. The theoretical diffraction pattern is intended to represent the diffraction pattern which would be produced by a cement composition comprising a mixture of the crystalline components indicated to be present in the DCB sample. The phase fractions of each of the crystalline phases may be determined by first generating a theoretical diffraction pattern representing the DCB sample. The theoretical diffraction pattern may be generated utilizing as inputs previously-obtained qualitative and/or quantitative information (e.g., the presence or absence of a given phase and/or other crystallographic structure information) previously gathered to calculate or otherwise develop a theoretical diffraction pattern. As will be explained in greater detail herein, the theoretical diffraction pattern may then be compared with the experimental diffraction pattern, and gradually adjusted so as to approach the experimental diffraction pattern. As the theoretical diffraction pattern approaches the experimental diffraction pattern, the crystallographic structure information utilized as an input to develop the theoretical diffraction pattern will reflect the crystallographic structure information of the DCB. In an embodiment, this information is used to quantify the phase fraction of one or more crystalline phases present in the DCB.

The theoretical diffraction pattern may be prepared manually, its preparation may be automated, or the preparation of the theoretical diffraction pattern may be combinations of manual and automated processes. In an embodiment, the preparation of a theoretical diffraction pattern is implemented via a computerized apparatus, wherein the preparation of a theoretical diffraction pattern is implemented in software on a computer or other computerized component having a processor, user interface, microprocessor, memory, and other associated hardware and operating software. Software implementing the preparation of a theoretical diffraction pattern may be stored in tangible media and/or may be resident in memory on the computer. Likewise, input and/or output from the software, for example ratios, comparisons and results may be stored in a tangible media, computer memory, hardcopy such a paper printout, or other storage device.

In an embodiment, the theoretical diffraction pattern is developed by one of ordinary skill in the art employing software programs known in the art for the generation of theoretical diffraction patterns. Such programs typically generate a theoretical diffraction pattern from a variety of data. For example, the theoretical diffraction pattern may be generated using information generated by the qualitative and quantitative crystallographic analysis of the experimental diffraction pattern conducted previously and accepted values for the crystallographic structural information of crystalline phases thought to be present. Nonlimiting examples of crystallographic structural information that may be utilized to generate the theoretical diffraction pattern are lattice parameters, atomic positions, fractional occupancies, thermal parameters, grain size, texture, and combinations thereof. Such information may be the result of the quantitative and qualitative analyses of the experimental diffraction pattern obtained previously and/or may be obtained by one of ordinary skill in the art from a variety of reference materials including published literature and/or crystallographic databases such as IUCR and American Mineralogist. For example, the theoretical diffraction pattern may be developed utilizing some or all of the crystallographic information for the phases previously determined to be present (including, but not limited to, atomic positions, lattice parameters, and thermal parameters, fractional occupancies, grain size, texture, or combinations thereof, as well as information of the diffraction experiment run (such as X-ray wavelength and equipment geometry).

The amount of each phase present initially within the theoretical diffraction pattern may be assigned arbitrarily. Alternatively, one of ordinary skill in the art with the benefits of this disclosure may develop a theoretical diffraction pattern comprising all of the determined crystalline phases and arbitrarily assign the amount of each crystalline phase present initially. Alternatively, one of ordinary skill in the art may hypothesize as to the relative amounts of each crystalline phase on the basis of a variety of factors (e.g., appearance, physical properties, etc. . . . ) of the DCB and thus assign the amounts of the crystalline phases present initially in the theoretical diffraction pattern on the basis of this hypothesis. In another embodiment, the amounts of crystalline phases present initially in the theoretical diffraction pattern may be set to equal amounts. In an embodiment, the amounts of each phase initially present within the theoretical diffraction pattern are assigned based on the amounts described in the initial cement blend formulation.

As will be understood by one of ordinary skill in the art, the amount of information utilized in the preparation of a theoretical diffraction pattern will be a factor in determining the degree with which the theoretical diffraction pattern accurately reflects the sample diffraction pattern.

In an embodiment, the method further comprises comparing the experimental diffraction to the theoretical diffraction pattern. A comparison of the theoretical diffraction pattern to the experimental diffraction pattern may involve a simple visual comparison of the two patterns to ascertain the accuracy with which the theoretical diffraction pattern reflects the sample diffraction pattern.

Alternatively, the accuracy with which the theoretical diffraction pattern reflects the experimental diffraction pattern may be determined using one or more algorithms which describe how well the theoretical diffraction pattern reflects the experimental diffraction pattern. The accuracy with which the theoretical diffraction pattern reflects the experimental diffraction pattern may be determined by calculating the goodness of fit, the residual value, the relative difference, or combinations thereof.

In an embodiment, the accuracy with which the theoretical diffraction pattern reflects the experimental diffraction pattern is determined by calculating the "goodness of fit." In an embodiment, the goodness of fit, represented by R/E, where R represents a residual value (described in detail later herein) and E represents the background (i.e., the contribution of some unmeasured aspect to a given pattern, often referred to as "noise") subtracted from the residual value, may be used to determine how well the theoretical diffraction pattern fits the experimental diffraction pattern. Additionally, the goodness of fit may be used to gauge whether too much or too little information (e.g., lattice parameters, atomic positions) has been supplied during generation and/or refinement of the theoretical diffraction pattern. Similarly, the residual value, which is the sum of the differences between the observations of the theoretical diffraction pattern and the observations of the experimental diffraction pattern, may be employed to determine the accuracy with which the theoretical diffraction pattern reflects the sample diffraction pattern. In these diffraction patterns, each peak of a diffraction pattern serves as a separate and distinct observation. In an embodiment, a goodness of fit when comparing the theoretical diffraction pattern to the experimental diffraction pattern is from about 1.0 to about 2.0, alternatively from about 1.0 to about 1.75; alternatively from about 1.0 to about 1.5. A goodness of fit of from about 1.0 to about 2.0 may indicate sufficient accuracy of the of the theoretical diffraction pattern.

In another embodiment, the accuracy with which the theoretical diffraction pattern reflects the experimental diffraction pattern may be analyzed via a "residual" value. A residual value (sometimes referred to as a "fitting error) is an observable estimate of an unobservable statistical error, in this case, the degree to which the theoretical diffraction pattern differs from the experimental diffraction pattern. Thus, by minimizing the residual value, represented by R, the accuracy with which the theoretical diffraction pattern reflects the experimental diffraction pattern will be increased. In an embodiment, the residual value is less than about 20%; alternatively less than about 15%; alternatively less than about 10%; alternatively less than about 5%. In an embodiment, a residual value of less than about 20% may indicate sufficient accuracy of the of the theoretical diffraction pattern.

In still another embodiment, the "difference pattern," that is the relative difference between the theoretical diffraction pattern and the experimental diffraction pattern, may also be used in analyzing the accuracy with which the diffraction theoretical pattern reflects the experimental diffraction pattern. The difference "line," is constructed using dimensionless values representing the relative difference between the theoretical diffraction pattern and the experimental diffraction pattern.

In an embodiment, the theoretical diffraction pattern reflects the experimental diffraction pattern with sufficient accuracy as determined by a goodness of fit, a residual value or both. In such an embodiment, the theoretical pattern is considered to be sufficiently representative of the experimental diffraction pattern.

In an alternative embodiment, the theoretical diffraction pattern reflects the experimental diffraction pattern with insufficient accuracy as determined by a goodness of fit, a residual value or both. In such an embodiment, the theoretical pattern is not considered to be sufficiently representative of the experimental diffraction pattern and the theoretical diffraction pattern is refined to more accurately reflect the experimental diffraction pattern. Any method for the refinement of the theoretical diffraction pattern to more accurately reflect the experimental diffraction pattern may be employed. In a non-limiting example, the theoretical diffraction pattern may be refined by the adjustment of any number of factors that would be apparent to one of ordinary skill in the art with the benefits of this disclosure. For example, the theoretical diffraction pattern may be refined by adjusting the thermal parameters, accounting for atomic substitutions in the crystal structure, adding background parameters to the refinements, adjusting the Caglioti or other shape functions of the diffraction patterns, or combinations thereof.

In an embodiment, refinement of the theoretical diffraction pattern is carried out utilizing the Rietveld refinement method. The Rietveld refinement methodology refines user selected parameters to minimize the difference between an experimental pattern (e.g., the sample diffraction pattern) and pattern based on a hypothesized crystal structure and instrumental parameters (e.g., theoretical diffraction pattern). The Rietveld refinement method can be used to refine information about a single crystal structure at a time using a whole pattern fitting method. By refining information about a single crystal structure at a time, the Rietveld refinement method may be used to determine the relative amounts of each phase within a multiple-phase sample. The Rietveld refinement method uses a least squares approach to refine a theoretical line profile until it matches a measured profile. The principle of the Rietveld refinement method is to minimize a function, represented by R, the weighted profile value, which represents the difference between a calculated profile, represented by $y^{calc.}$ and the observed profile, represented by $y^{obs.}$:

$$R = \Sigma W_i \{y_i^{obs} - y_i^{calc}\}^2 / \Sigma W_i [y_i^{obs}]^2$$

where $y_i^{obs}$ is the observed intensity at step I, $y_i^{calc}$ is the calculated intensity, and $W_i$ is the weight. Rietveld refinement method is described in more detail in R. A. Young, The Rietveld Method, (Oxford University Press 1995), See also B. D. Cullity & S. R. Stock, Elements of X-Ray Diffraction (3rd ed., Prentice Hall 2001) (1959) which is incorporated in its entirety herein by reference.

In an embodiment, the Rietveld refinement method may be performed manually, may be automated, or may be combinations of manual and automated processes. In an embodiment, the Rietveld refinement method is implemented via a computerized apparatus, wherein the method is implemented in software on a general purpose computer or other computerized component having a processor, user interface, microprocessor, memory, and other associated hardware and operating software. Software implementing the method may be stored in tangible media and/or may be resident in memory on the computer. Likewise, input and/or output from the software, for example ratios, comparisons, and results, may be stored in a tangible media, computer memory, hardcopy such a paper printout, or other storage device. Nonlimiting examples of computer programs that may be suitable for use in carrying out the Rietveld refinement methodology include "GSAS+ EXPGUI" freely available at the website www.ccp14.ac.uk/solution/gsas/; "FULLPROF" freely available at the website www.ill.eu/sites/fullprof/php/programs71b4.html?pagina=FP_Studio; "RIETICA" freely available at the website www.rietica.org/; "PSSP" information on this program is available at the website powder.physics.sunysb.edu/programPSSP/pssp.html; "MAUD" freely available at the website www.ing.unitn.it/~maud/download.html; "POWDERCELL" freely available at the website www.lmcp.jussieu.fr/sincris/logiciel/prg-powdercell.html; "CRYSTALMAKER" commercially available from Crystal-Maker Software, Ltd.; "PANALYTICAL HIGHSCORE PLUS" commercially available from PANalytica; "BRUKER TOPAS" commercially available from Bruker AXS; "JADE" commercially available from Materials Data, Inc.; "RUBY" commercially available from Materials Data, Inc. or combinations thereof. One or more of these programs may also have the capability of performing one or more of the previously described methodologies disclosed herein.

In an embodiment, a theoretical diffraction pattern is refined using the Rietveld refinement method and compared to the experimental diffraction pattern as described previously herein. Refinement of the theoretical diffraction pattern and comparison to the experimental diffraction pattern may continue iteratively until the theoretical diffraction pattern converges with the experimental diffraction pattern. Refinement of the theoretical diffraction pattern and comparison to the experimental diffraction pattern may be carried out manually or may be automated as previously described herein. Herein convergence refers to the point at which the theoretical diffraction pattern reflects with sufficient accuracy the experimental diffraction pattern, and the resultant theoretical diffraction pattern is referred to as the refined theoretical diffraction pattern (RTDP). Herein sufficient accuracy refers to the goodness of fit, residual value or both having values within the ranges disclosed previously herein. Hereinafter, the disclosure will focus on the use of the RTDP however it is contemplated that in some embodiments the theoretical diffraction pattern in the absence of refinement will accurately reflect the experimental diffraction pattern. In such embodiments, the theoretical diffraction pattern in the absence of refinement may be utilized in lieu of the RTDP.

In an embodiment, the method further comprises analysis of the RTDP to determine the composition of the DCB sample. More particularly, the crystallographic structure, and information regarding the nature and amount of crystalline components present in the DCB may be determined by analysis of the RTDP. The analysis may be carried out by one of ordinary skill in the art with the benefits of this disclosure. In some embodiments, the crystallographic structure and information regarding the nature and amount of crystalline components in the RTDP is generated by the software program used to carry out the refinement of the RTDP. Alternatively, information generated by the software program on the crystallographic structure of the RTDP may be transferred to another program for analysis and determination of the nature and amount of crystalline components present in the RTDP. The RTDP which reflects with sufficient accuracy the experimental diffraction pattern is used as a surrogate for the experimental diffraction pattern. Thus, the information obtained from analysis of the RTDP is representative of the sample (i.e., DCB). In an embodiment, the RTDP that is generated using the Rietveld method provides both compositional and crystallographic information. For example, the results of the Rietveld refinement may provide information on both the relative phase fractions of the crystalline components in a DCB and crystallographic parameters (e.g., lattice parameters, atomic positions) of those phase fractions. Further, the RTDP may be analyzed to determine the total amount of non-crystalline material present in the DCB.

In an embodiment, the information obtained on the quantity and identity of the crystalline components present in the DCB, is used to prepare a final dry cement blend formulation (ACTUAL) that describes the amount and type of each crystalline component present in the DCB. In an embodiment, the ACTUAL additionally describes the total amount of non-crystalline material present. The ACTUAL may then be compared to the initial dry cement blend formulation. In an embodiment, the ACTUAL is not considered to be sufficiently similar to the initial dry cement blend formulation and the DCB is deemed not suitable for use in the particular wellbore servicing operation for which the initial dry cement blend formulation was generated.

In an alternative embodiment, the ACTUAL is considered to be sufficiently similar to the initial cement blend formulation and the DCB is deemed suitable for use in the particular wellbore servicing operation for which the initial cement blend formulation was generated. Herein "sufficiently similar" refers to a variance between the ACTUAL and initial cement blend formulation being such that the cement composition formed would be expected to have no greater than about a 10%, 5%, or 1% change in one or more properties relevant to the suitability of the cement for the particular application. Examples of comparative properties include without limitation compressive strength, permeability, elastic modulus, rheology, and thickening time.

In an embodiment, the DCB which has been deemed suitable for use is contacted with water and one or more additives to prepare a cement slurry. For example, the DCB may be contacted with a sufficient amount of water to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The cementitious slurry may comprise a density from about 4 lb/gallon to about 23 lb/gallon. In an embodiment, the cementitious slurry may comprise a density from about 12 lb/gallon to about 17 lb/gallon. In alternative embodiments, the cementitious slurry may be a low-density cement composition with a density from about 6 lb/gallon to about 14 lb/gallon.

In some embodiments, additives may be included in the cement slurry for improving or changing the properties thereof. Examples of such additives include but are not limited to defoamers, foaming surfactants, fluid loss agents, latex emulsions, dispersants, formation conditioning agents, hollow glass or ceramic beads or combinations thereof. Other mechanical property modifying additives, for example, elastomers, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art with the benefits of this disclosure.

The wellbore servicing compositions (e.g., cementitious slurry) disclosed herein can be used for any purpose. In an embodiment, the wellbore servicing compositions disclosed herein are used to service a wellbore that penetrates a subterranean formation. It is to be understood that "subterranean formation" encompasses both areas below exposed earth and areas below earth covered by water such as ocean or fresh water.

In an embodiment, the wellbore servicing composition may be employed in well completion operations such as primary and secondary cementing operations. The wellbore servicing composition may be placed into an annulus of the wellbore and allowed to set such that it isolates the subterranean formation from a different portion of the wellbore. The wellbore servicing composition thus forms a barrier that prevents fluids in the subterranean formation from migrating into other subterranean formations. Within the annulus, the wellbore servicing composition also serves to support a conduit, e.g., casing, in the wellbore. In an embodiment, the wellbore in which the wellbore servicing composition is positioned belongs to a multilateral wellbore configuration. It is to be understood that a multilateral wellbore configuration refers to a primary wellbore with one or more secondary wellbore branches radiating from the primary borehole.

In secondary cementing, often referred to as squeeze cementing, the wellbore servicing composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a wellbore servicing composition in a wellbore are described in U.S. Pat. Nos. 5,346,012 and 5,588,488, which are incorporated by reference herein in their entirety.

EXAMPLES

The embodiments having been generally described, the following examples are given as particular embodiments of the disclosure and to demonstrate the practice and advantages thereof. It is to be understood that the examples are presented herein as a means of illustration and are not intended to limit the specification of the claims in any manner.

Example 1

The ability of the Rietveld refinement method to produce results similar to those observed when using conventional analytical techniques was explored. A Dyckerhoff class G cement was analyzed by QXRD, Bogue analysis or the Rietveld method. The results are presented in Table 1.

TABLE 1

| Component | QXRD | Oxide | Rietveld | Rietveld* |
|---|---|---|---|---|
| C3S | 52.0 | 56.7 | 51.8 | 53.8 |
| C2S | 28.4 | 20.9 | 19.8 | 23.3 |
| C4AF | 14.4 | 17.1 | 18.4 | 19.2 |
| C3A | 1.8 | 1.1 | 6.3 | 0.0 |
| Gypsum | 3.4 | 4.2 | 3.7 | 3.7 |
| R | N/A | N/A | 4.1 | 4.0 |
| E | N/A | N/A | 3.2 | 3.2 |

*C3A was not included in the second refinement due to poor confirmation of presence in the sample.

C3A refers to $3CaOAl_2O_3$; C2S refers to $2CAOSiO_2$; C4AF refers to $4CaOAl_2O_3Fe_3O_4$; gypsum is a common name fro calcium sulfate dehydrate; R refers to the weighted residual and E refers to the weighted residual with the background subtracted. Oxide refers to the Bogue calculation which is used to calculate the approximate proportions of the four main minerals in Portland cement clinker QXRD refers to a semi-quantitative analysis of an XRD pattern based solely on crystallographic peak intensities of individual components. The results demonstrate a good correlation between the results obtained from any of the independent methods for quantifying the cement.

Example 2

Figure 1B:
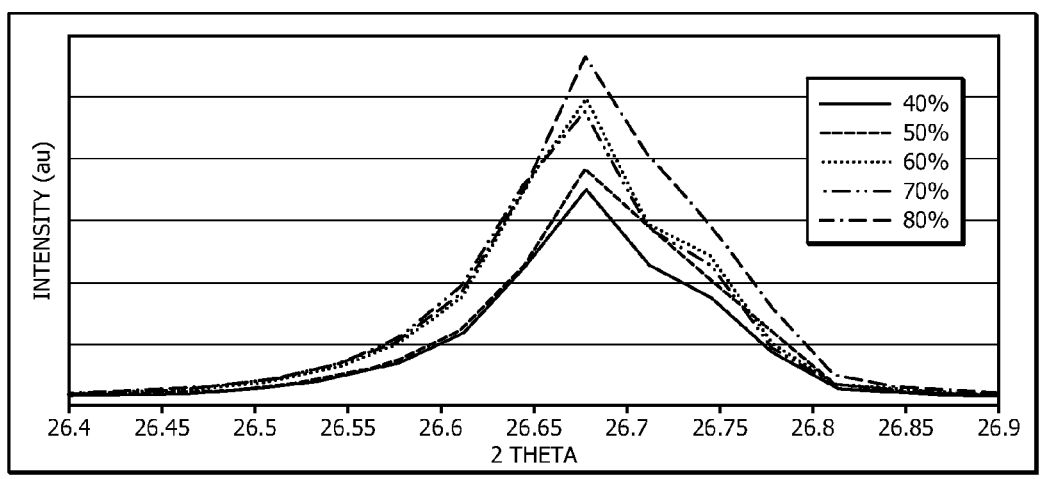
FIG. 1B is an expanded view of the XRD spectra for the samples from Example 2.

A cement blend was prepared using a Dyckerhoff class G cement as the base cement to which was added from 40 wt. % to 80 wt. % SSA-1 strength retainment additive which is a crystalline silica flour commercially available from Halliburton Energy Services Inc. An XRD spectra was obtained for each sample and an overlay of the XRD patterns obtained for samples 1-5 is presented in FIG. 1A, while FIG. 1B presents an expanded view of the characteristic intensity peak in the XRD spectrum attributed to quartz. The Rietveld method was used to quantify the presence and amount of crystalline silica and this amount was compared to the amount expected on the basis of initial blend design. These results are presented in Table 2.

TABLE 2

|  | Sample No. | | | | |
| --- | --- | --- | --- | --- | --- |
|  | 1 | 2 | 3 | 4 | 5 |
| $SiO_2$ (bwoc) added to base cement | 40% | 50% | 60% | 70% | 80% |
| Values calculated using XRD and Rietveld refinement method | | | | | |
| C3S | 38.7 | 37.5 | 35.9 | 33.5 | 31.7 |
| C2S | 13.4 | 10.7 | 11.1 | 9.2 | 8.3 |
| C4AF | 12.5 | 11.4 | 9.5 | 10.1 | 9.4 |
| Gypsum | 1.9 | 1.7 | 1 | 1.2 | 1.2 |
| Quartz-XRD and Reitceld | 33.6 | 38.7 | 42.1 | 46 | 49.4 |
| R | 4.1 | 4.16 | 4.5 | 4.33 | 4.43 |
| E | 3.13 | 3.13 | 3.09 | 3.09 | 3.09 |
| Quartz from Blend (volume %) | 32.6 | 37.7 | 42.0 | 45.8 | 49.2 | bwoc = by weight of cement

The quartz from blend is the amount of quartz that was calculated to be present in the silica flour when added to the base cement. This value was compared to the quartz value that was calculated to be present based on the use of XRD and the Rietveld refinement method. As noted, the volume fraction of quartz quantified in the blend using the Rietveld refinement method had at most a variance of 3%.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
preparing a dry cement bland comprising a base cement and a crystalline component and mixing the dry cement blend to homogeneity wherein the dry cement blend is formulated based on an initial dry cement blend formulation;
obtaining an experimental diffraction pattern of a sample of the dry cement blend wherein the sample has not been admixed with water;
generating a model diffraction pattern;
refining the model diffraction pattern to generate a refined model diffraction pattern wherein refining comprises subjecting the model diffraction pattern to a structural refinement method;
determining a type and amount of crystalline- and noncrystalline components present in the dry cement blend based on the refined model diffraction pattern;
generating a final dry cement blend formulation by adjusting one or more components of the initial dry cement blend formulation in response to the refined model diffraction pattern; and comparing the initial dry cement blend formulation to the final dry cement blend formulation, wherein a compressive strength of a slurry formed from the initial dry cement blend formulation differs from the a compressive strength of a slurry formed from the final dry cement blend formulation by less than about 10%;
contacting the final dry cement blend formulation with water and one or more additives to form a cement slurry;
placing the cement slurry downhole; and
allowing the cement slurry to set.

2. The method of claim 1 wherein the base cement comprises a hydraulic cement.

3. The method of claim 2 wherein the hydraulic cement comprises a Portland cement.

4. The method of claim 1 wherein the base cement is present in an amount of from about 1 wt. % to about 99 wt. % based on an amount of total solids in the dry cement blend.

5. The method of claim 1 wherein the experimental diffraction pattern comprises an X-Ray diffraction pattern, neutron diffraction pattern, or combinations thereof.

6. The method of claim 1 wherein refining of the model diffraction pattern is carried out by subjecting the model diffraction pattern to a Rietveld refinement method.

7. The method of claim 1 wherein refining of the model diffraction pattern is carried out until the model diffraction pattern accurately reflects a sample diffraction pattern.

8. The method of claim 7 wherein the model diffraction pattern accurately reflects the sample diffraction pattern when a goodness of fit is from 1.0 to about 2.0, a residual value is less than about 20%, or both.

9. The method of claim 1 wherein the crystalline component comprises silica; crystalline high-density additives, calcium chloride, sodium chloride, potassium chloride, perlite, zeolites, micas, alumina, aluminum hemihydrate, tartaric acid, sodium pentaborate or combinations thereof.

10. The method of claim 9 wherein the silica comprises fine flour silica, flour silica, sand, quartz, or combinations thereof.

11. The method of claim 9 wherein the high density additive comprises barite, hematite, hausmannite, siderite, ilmenite, or combinations thereof.

12. The method of claim 9 wherein the crystalline component is present in an amount of from about 0.1 wt. % about 200 wt. % based on the total weight of the dry cement blend.

13. The method of claim 1 further comprising determining a suitability of the dry cement blend for a particular wellbore servicing application.

14. The method of claim 1 further corn rising conducting qualitative analysis of the experimental diffraction pattern.

15. The method of claim 1 further comprising conducting quantitative analysis of the experimental diffraction pattern.

16. The method of claim 1 wherein refining the model diffraction pattern comprises assigning amounts of at least one crystalline phase initially present within the experimental diffraction pattern based on amounts of the crystalline components described in the initial dry cement blend formulation.

17. The method of claim 1 wherein a comparison of the initial dry cement blend formulation to the final cement blend formulation shows a variance of less than about 10%.

18. The method of claim 1 wherein placing the cement slurry downhole is a primary cementing operation, or a secondary cementing operation.

19. The method of claim 18 wherein the secondary cementing operation is squeeze cementing.

20. The method of claim 1 wherein the cement slurry is placed in an annulus of the wellbore.

* * * * *